US008864905B2

(12) United States Patent
Alvarez Galindo et al.

(10) Patent No.: US 8,864,905 B2
(45) Date of Patent: Oct. 21, 2014

(54) USE OF CARBOXYMETHYL CHITOSANS AS ADDITIVES IN AGGLOMERATING COMPOSITIONS

(75) Inventors: Jose Ignacio Alvarez Galindo, Pamplona (ES); Jose Maria Fernandez, Pamplona (ES); Maria Lasheras Zubiate, Pamplona (ES); Inigo Navarro Blasco, Pamplona (ES)

(73) Assignee: Universidad De Navarra, Pamplona (Navarra) (ES)

( * ) Notice: Subject to any disclaimer, the term of this patent is extended or adjusted under 35 U.S.C. 154(b) by 0 days.

(21) Appl. No.: 13/876,393

(22) PCT Filed: Sep. 28, 2011

(86) PCT No.: PCT/ES2011/070682
§ 371 (c)(1),
(2), (4) Date: Mar. 27, 2013

(87) PCT Pub. No.: WO2012/042090
PCT Pub. Date: Apr. 5, 2012

(65) Prior Publication Data
US 2013/0186305 A1     Jul. 25, 2013

(30) Foreign Application Priority Data
Sep. 29, 2010 (ES) .................................. 201031445

(51) Int. Cl.
| | | |
|---|---|---|
| C04B 16/04 | (2006.01) | |
| C04B 26/28 | (2006.01) | |
| C04B 24/38 | (2006.01) | |
| C04B 24/10 | (2006.01) | |
| C08B 37/08 | (2006.01) | |
| C09J 105/08 | (2006.01) | |
| C08L 5/08 | (2006.01) | |
| C04B 103/00 | (2006.01) | |
| C04B 103/12 | (2006.01) | |

(52) U.S. Cl.
CPC ............... *C04B 24/10* (2013.01); *C08B 37/003* (2013.01); *C04B 2103/008* (2013.01); *C09J 105/08* (2013.01); *C08L 5/08* (2013.01); *C04B 2103/12* (2013.01); *C04B 24/38* (2013.01)
USPC .......... 106/804; 106/727; 106/729; 106/779; 106/795

(58) Field of Classification Search
USPC ......................... 106/779, 804, 727, 729, 795
See application file for complete search history.

(56) References Cited

U.S. PATENT DOCUMENTS 7,736,423 B2 * 6/2010 Knoll et al. ................ 106/18.32
2006/0112862 A1    6/2006 Nguyen

FOREIGN PATENT DOCUMENTS

RU           2297402 C2     4/2007
WO    WO2009/129316 A2 * 10/2009

OTHER PUBLICATIONS

Derwent-Acc-No. 2007-299686, abstract of Russian Patent Specification No. 2297402C2 (Apr. 2007).*
M. Lasheras-Zubiate et al., Interaction of Caboxymethylchitosan and Heavy Metals in Cement Media, Journal of Hazardous Materials, 2011, vol. 194, pp. 223-231.
U. T. Bezerra et al., The Effect of Latex and Chitosan Biopolymer on Concrete Properties and Performance, Key Engineering Materials, 2011, vol. 466, pp. 37-46.
D. Kim et al., Inorganic-organic Cementitious Material Modified with Minute Amount of Biopolymers in a Crosslinked Structure, Concrete Materials: Properties, Performance and Applications, 2009, pp. 535-548.
K. Friedermann et al., Carboxylates and Sulfates of Polysaccharides for Controlled Internal Water Release During Cement Hydration, Cement & Concrete Composites, 2009, vol. 31, pp. 244-249.
N. T. An et al., Water-Soluble N-carboxymethyl Chitosan Derivatives: Preparation, Characteristics and its Application, Carbohydrate Polymers, 2009, vol. 75, pp. 489-497.
International Search Report Application No. PCT/ES2011/070682, Dated Feb. 16, 2012 (English translation).

* cited by examiner

*Primary Examiner* — Anthony J Green
(74) *Attorney, Agent, or Firm* — Kramer Levin Naftalis & Frankel LLP

(57) ABSTRACT

The present invention belongs to the field of binder compositions for construction, more specifically it relates to the use of carboxymethylchitosan as flocculating additive and setting accelerator in binder compositions of the cement, cement mortar, concrete, grout, stucco and similar type. The invention also relates to binder compositions comprising carboxymethylchitosan, as well as to the method for their preparation.

16 Claims, 5 Drawing Sheets

USE OF CARBOXYMETHYL CHITOSANS AS ADDITIVES IN AGGLOMERATING COMPOSITIONS

This application is the United States national phase filing of the corresponding international application number PCT/ES2011/070682, filed on Sep. 28, 2011, which claims priority to and benefit of ES Application No. P201031445, filed Sep. 29, 2010, which applications are hereby incorporated by reference in their entirety.

FIELD OF THE INVENTION

The present invention belongs to the field of binder compositions for construction, more specifically it relates to the use of carboxymethylchitosan as flocculating additive and setting accelerator in binder compositions of the cement, cement mortar, concrete, grout, stucco and similar type. The invention also relates to binder compositions comprising carboxymethylchitosan, as well as to the method for their preparation.

BACKGROUND OF THE INVENTION

In a cement or concrete mixture, both the plastic (fresh) state and the hardened state thereof are defined by the type and degree of attraction between particles. The "bleeding" process defined as the appearance of water accumulated on the surface of the materials and heterogenous separation (segregation) due to density difference of the aqueous phase and the aggregate, is precisely largely conditioned by the type of attraction between particles. The main objective of a specific type of flocculating additives (or thickeners) is precisely to minimize or reduce this heterogenous phase separation by means of altering the attractive forces between the particles, which affects the colloidal state of the aqueous phase of the cement. It must be taken into account that "bleeding" affects the durability, the mechanical strengths and the possibilities of applying the material (Josserand et al. *Cement and Concrete Research* 2006; 36(9):1603-1608).

It is thought that material flocculation or thickening process occurs due to the interaction of highly charged groups in the molecular chain of the flocculating agent with cement particles. The chains are adsorbed on those particles, binding them and giving rise to an attraction between particles. The cohesion increases, slump flow in flow table test decreases and "bleeding" is reduced. The effects on mechanical strengths under compression closely depend on the dose of flocculant or thickener used (Ramachandran, *Concrete Admixtures Handbook,* "$2^{nd}$ Edition, Noyes Publications, New Jersey, 1995).

Particularly, in the context of rendering or spread mortars, it is necessary for the material to have a consistency such that it does not flow through the vertical face, and furthermore it usually requires a substantial shortening of setting times which forces the use of setting accelerating additives for certain applications as spread mortars for tunnels.

This second type of compounds reduce setting times and accelerate the development of early mechanical strengths, which entails advantages with respect to the times for executing the work, putting into service, reducing the risks due to frost, etc.

The joint solution for both requirements (thickening the fresh cement mixture and accelerating the setting times) is usually achieved by means of using two or more different additives. Some of the additives used especially as setting accelerants have problems associated with their use, for example, the corrosion of metal reinforcements incorporated to the cement system when calcium chloride is used as accelerant; or the high level of soluble salts incorporated to the mixture, given the generally high dosages necessary for some of these products (Justnes and Nygaard, *Cement and Concrete Research* 1995; 25(8):1766-1774; Aiad et al., *Cement and Concrete Research* 2003; 33:9-13; Aggoun et al. *Construction and Building Materials* 2008; 22:106-110).

In turn, polyelectrolytes which have been occasionally used as thickeners or flocculants either have environmental repercussions due to their origin and hazardous effect on the ecosystems (such as polyacrylamide or polyvinyl polymers, for example) or the origin thereof does not contribute to sustainable construction industry development (such as cellulose derivatives of plant origin and the inherent risks of deforestation).

Attempts have been made to find additives which overcome the preceding problems and which to the extent possible act as multipurpose additives, for example as an additive which is both a flocculant and a setting accelerator, in order to reduce the use of different additives in the preparation of cementitious compositions.

One of the additives which have been used is chitosan. Chitosan is the product from the N-deacetylation of a natural biopolymer, chitin. It consists of glucosamine and N-acetyl-glucosamine units bound by 1-4 glycosidic bonds. It is therefore a chitin derivative, a natural biopolymer, the second most abundant biopolymer after cellulose, found in the exoskeletons of invertebrates such as crustaceans and insects. Chitosan has good solubility in different acidic solutions and is insoluble in neutral and alkaline aqueous solutions. The term chitosan is used in a generic manner to designate any glucosamine and N-acetylglucosamine-based copolymer, regardless of its molecular weight (50 to 2000 kDa) and degree of deacetylation (40-98%), even though it has been confirmed that the degree of deacetylation and the molecular weight determine the properties of the polymer. Chitosan has a good resistance in alkaline media, is flexible and has high resistance to heating due to the intramolecular hydrogen bonds formed between the hydroxyl and amino groups (Muzzarelli, C., and Muzzarelli, R. A. A, *Journal of Inorganic Biochemistry* 2002; 92(2):89-94).

BRPI0600628, WO86/00291, JP52022026 and JP2001316162 are some of the documents describing the use of chitosan as an additive in binder compositions for construction. However, they face the problem of the extremely poor solubility of this compound especially at the strongly basic pH of such compositions.

Document BRPI0600628 describes a cementitious composition suitable for constructing oil wells comprising chitosan in a proportion of 1-5%. The addition of chitosan to the matrix of Portland cement confers it greater mechanical strength and reduces the probability of cracking under severe temperature conditions.

Application WO 86/00291 describes cementitious compositions comprising a flocculating agent selected from a list of polymers among which chitosan is included. Nevertheless, the preferred embodiment contemplates the use of carboxymethylcellulose.

Document JP52022026 describes a cementitious composition comprising Portland cement and chitosan. The product molded with the composition described in this document has a bending strength greater than that achieved for the product molded in the absence of chitosan.

Document JP2001316162 describes a method for increasing the strength of a calcium silicate board for walls and ceilings which comprises adding an acidic solution of chitin and chitosan to the base material when curing in an autoclave.

The use of chitosan as an additive in binder compositions for construction poses a problem: the insolubility of non-modified chitosan at strongly alkaline pH of the binder matrix with Portland cement base, limiting its action on the aqueous phase of the mixture and therefore its action on the rheology in the mixtures in fresh state.

There is also a need to develop new multipurpose additives which improve the properties of the already existing additives and which act on more than one of the main functions defined for other additives, for example, that the additives meet the double objective of functioning as flocculating agents and setting accelerators. Furthermore, it is desirable that said additives can be incorporated in the lowest doses possible in the matrix of the cementitious compositions. Additionally, it will also be highly desirable for them to be non-caustic, which contributes to occupational safety and health.

The present application is based on the inventors confirming that the incorporation of carboxymethylchitosan, a carboxymethyl-substituted derivative of chitosan, as an additive in binder compositions (such as for example cement mortars or the like) results in a double effect:
- a clear thickening (flocculating) effect of the system in fresh (or plastic) state, a reduction in the slump flow value in the flow table (a test defined in the UNE-EN standards for evaluating the consistency of a mortar in fresh state), with reductions, and therefore thickenings of up to 50% depending on the dose, being observed.
- a considerable setting acceleration in these mixtures, with already studied reductions in workability time of up to 98% (from 322 minutes, with a 0.5 water/cement ratio for an additive-free mortar, to 7 minutes of workability time for mortars with 0.5% additive by mass with respect to the cement).

Furthermore, this double effect is clearly shown starting from very low doses of carboxymethylchitosan, especially if compared with the necessary doses of other additives to achieve similar effects (approximately 4-6% in the case of aluminates and 8-12% in the case of silicates, always with respect to the cement/binder weight. Rey A., Spread Concrete: Dosage, Manufacture and Implementation, 1$^{st}$ Conference on Spread Concrete (Hormigón Proyectado: Dosificación, Fabricación y Puesta en Obra, I Jornada sobre Hormigón Proyectado), on line, www.comerciallinas.com/PDF/Sikaproyectado.pdf) and in the absence of chlorides. Therefore, some of the advantages of the present invention are: reduction in raw material consumption, cost optimization and reduction in risks derived from using corrosive chemical products at work (transportation restrictions, storage condition limitations and the risk of accident due to exposure to chemical products through respiratory pathway and or skin are reduced).

DETAILED DESCRIPTION OF THE INVENTION

Figure 1:
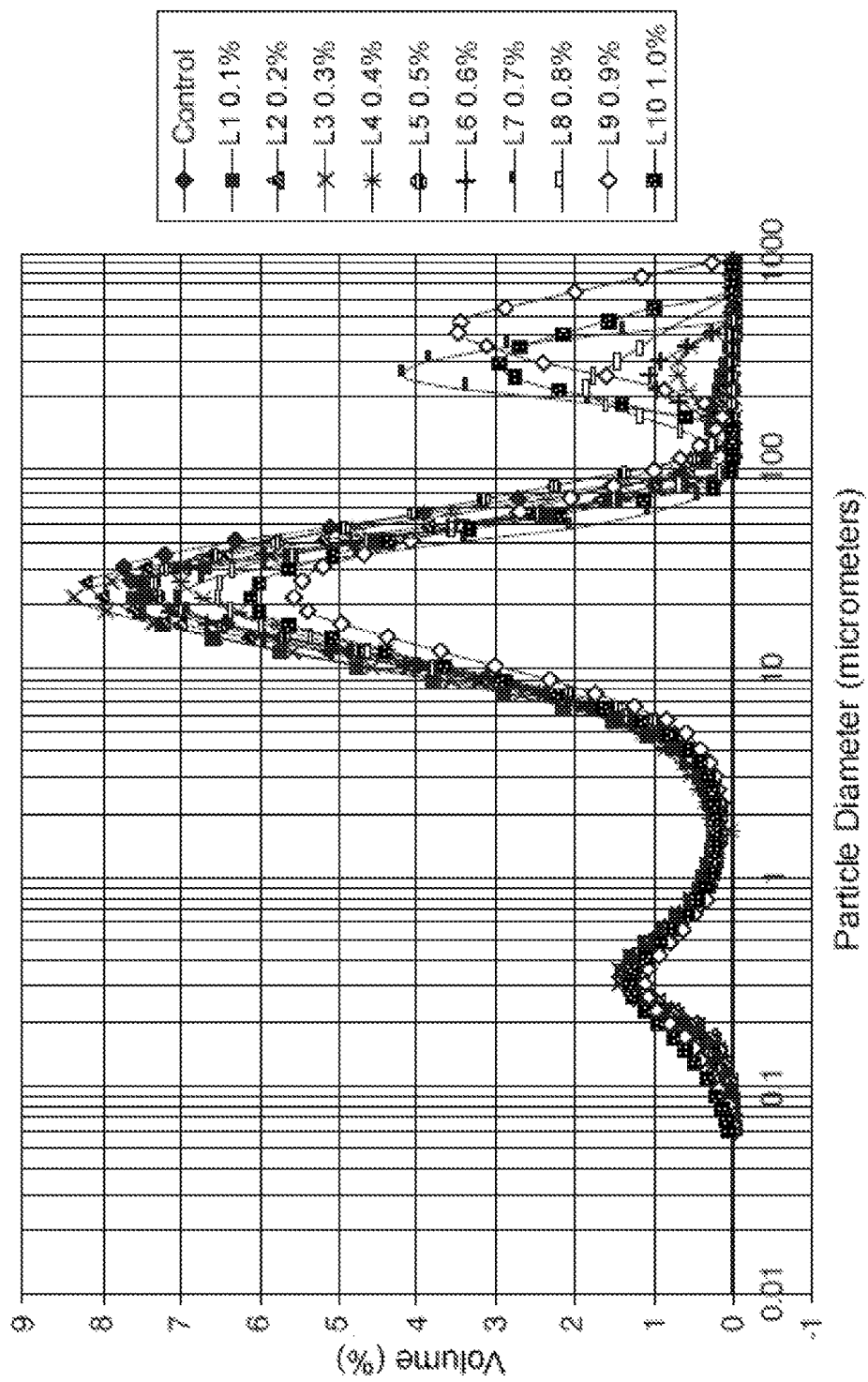
FIG. 1 shows the results of particle size distribution in cement suspensions for additive 1, carboxymethylchitosan. Control: 0% additive. L1 to L10 (0.1% to 1% additive, weight/weight of additive/cement). Particle diameter vs % volume.

The present invention is based on the surprising double effect of carboxymethylchitosan in flocculation and in accelerating setting in binder compositions intended for construction.

To facilitate the understanding of the present invention, the meaning of some terms and expressions as used in this description is indicated below.

"Binder composition" or "binder mixture" for construction, is understood as any composition in which at least one binder for construction is mixed with a mixing fluid, typically water, optionally with one or more aggregates of various grain sizes and also optionally with one or more additives and/or additions. As a result, the binder compositions include both mixtures, i.e., mixtures including at least one binder, water and optionally additives and/or additions, lacking aggregates and mixtures containing water, at least one binder, aggregates and, optionally additives and/or additions. As will be known by the person skilled in the art, said mixtures can be composite or mixed mixtures, i.e., several types of binders can be combined.

The term "binder" for construction refers to those products of inorganic and mineral nature obtained from natural raw materials and where appropriate, from industrial byproducts, which in a dry, solid state, kneaded with a mixing fluid, particularly water, set and harden because the compounds resulting from their hydration are stable in such conditions. They are therefore materials capable of binding fragments of one or several substances and providing cohesion to the assembly by chemical transformations in their mass giving rise to new compounds and are used for producing conglomerates in order to obtain stable and long-lasting constructive elements. A binder is referred to as an air binder when it can only be hardened in contact with air and is referred to as a hydraulic binder when it can be hardened indifferently in contact with air and submerged in water. According to the present invention, a binder for construction is preferably selected from a cement, a lime, a gypsum and/or mixtures thereof.

The "cement binder" is particularly the one referred to as "cement", obtained by clinkering and belonging to hydraulic binders according to European regulations EN 197-1:2000 and EN 197-2:2000 and Spanish regulation UNE-EN-197-1:2000, for example. Therefore, in the context of the present invention, the term cement refers to that binder the main component of which is the "clinker". The clinker can be of the Portland type (obtained by calcinating artificially prepared, very intimate limestone and clay mixtures until partial melting to achieve a practically complete combination of their components) or of calcium aluminate (obtained by melting a limestone and bauxite mixture). From chemistry viewpoint, it relates generally to a silicate and calcium aluminate mixture.

In the context of the invention, the term "cement" also refers to cements with special characteristics and belonging to the sub-classification of cements shown by UNE 80.303-1:2001, 80.303-2:2001, 80.303-3:2001 standards and UNE 80305:2001 standard.

As used in the present document, the term "lime" refers to that binder made up primarily of calcium oxides and hydroxides (CaO, Ca(OH)$_2$), with lower amounts of magnesium, (MgO, Mg(OH)$_2$, silicon (SiO$_2$), aluminum (Al$_2$O$_3$) and iron (Fe$_2$O$_3$), for example according to European and Spanish regulation UNE-EN 459-1 of 2002.

According to the present invention, the term "gypsum" is a product prepared from a natural stone referred to as gypsum rock (calcium sulfate dihydrate: CaSO$_4$.2H$_2$O), by means of dehydrating and subsequent milling, which once kneaded with water, sets and hardens. The gypsum can also incorporate light aggregates and certain additives to modify its characteristics (second and third generation gypsums). Examples of gypsums are listed in the European UNE-EN 13279-1: 2006 standard.

In construction, the binder and water mixture is referred to as "paste" and it is said to have a normal consistency when the amount of kneading water is equal to the gaps of the loose binder; if it is less it will be dry and if it is more it will be fluidic, and it is referred to as "grout" when it is kneaded with a lot of water. The pastes take the name of the binder (for example cement paste or gypsum paste). If two or more binders are involved, they are called mixed or composite pastes (for example, lime and cement paste).

In the field of construction, the terms "mortar" and "concrete" are defined as "mixtures of one or more inorganic binders, aggregates, water and optionally additives and/or additions" and are also named according to the binder. In the context of the present invention, reference is made to mortar when the aggregate used is fine and to concrete when it includes both fine and coarse aggregate.

As understood in construction, the term "aggregate" refers to an inert granular material formed by rock fragments (stone, loose stone and gravel) or sands which are added to one or more inorganic binders to form concrete or mortar and are classified particularly in UNE 146100 standard (Aggregates for mortars. Definitions and requirements), UNE-EN 12620/ AC:2004 standard (Aggregates for concrete) and UNE 146901:2002 standard (Aggregates. Designation). The material formed by hard and resistant particles of which at least 95% by weight passes through No. 4 ASTM sieve is defined as a fine aggregate. The fraction of mineral aggregate of which at least 70% by weight is retained in No. 4 ASTM sieve is defined as a coarse aggregate. The coarse aggregates may be pebbles or crushed aggregates.

As used herein, the term "sand" refers to any material originating from natural rocks, reduced by nature or by means of crushing, to particles the sizes of which are comprised between 0.02 mm and 5 mm.

In the field of construction, "additives" are those substances or products (inorganic or organic) which, incorporated to a mortar or concrete before kneading (or during same or in the course of a supplementary kneading) in a proportion not greater than 5% with respect to the binder weight, cause the desired modification in fresh or hardened state of one of its characteristics, of its common properties or of its behavior. These additives are particularly classified in European EN 934.2 standard and its official version in Spain UNE-EN 934.2. There are other variety of products which, without actually being additives themselves and therefore without being classified as additives, can be considered as such, since they modify the properties of concrete, as occurs with colorants or pigments which act on color, gas generators which act on density, etc.

"Setting accelerating additive": An additive which reduces the transition time of the mixture from the plastic state to the rigid state and which normally reduces its workability time.

In a generic manner, the incorporation of a setting accelerant causes an increase in initial strength and a decrease in final strength.

"Flocculants" are additives having the purpose of increasing the exudation rate and reducing the volume thereof, while at the same time reducing the flow and increasing the cohesiveness and initial rigidity of the mixture.

The term "additions" refers to those inorganic materials which stand out due to their pozzolanic or hydraulic characteristics and which are added to a concrete or mortar in doses greater than 5% with respect to the binder weight (10-15%), for example, natural or artificial limestone and pozzolana fillers (fly ash, blast furnace slags, silica fume, etc). Their function is similar to that of the additives, improving its properties or providing it with special characteristics. By way of example, UNE 83414:1990, UNE 83481:1996 and UNE 83460:2005 standards provide recommendations for the addition of fly ash, slags and silica fume, respectively, to concretes.

As used in the present document, "approximately" refers to a range of values close to a specific value, such as ±10% with respect to a specific value. For example, "approximately 20" includes ±10% with respect to 20, or from 18 to 22. Furthermore, whether or not the term "approximately" is specified, the person skilled in the art understands that any numerical value expressed in the present document encompasses a close range of values. Such variations in a specific value can result from experimental errors during the corresponding measurement.

The first object of the present invention is the use of carboxymethylchitosan as flocculating additive and setting accelerator in binder compositions for construction.

Carboxymethylchitosan is useful as an additive for a large variety of binder compositions, such as for example, paste, grout, stucco, mortar, concrete, etc. Nevertheless, due to the surprising effect in setting and in flocculation of said compositions, it is especially suitable for those applications which require short workability times and considerable increases of mixture viscosity to prevent slump flows.

In a preferred embodiment of the invention, the binder of the composition is a cement and a "cementitious composition" or "cement mixture" is obtained. Thus, the use of carboxymethylchitosan is especially useful in the preparation of concrete and cement mortar, especially in the preparation of spread concrete and spread cement mortar (those which when applied using a machine are spread at great speed on a surface through a hose and nozzle).

The carboxymethylchitosan used according to the present invention has the general formula (I):

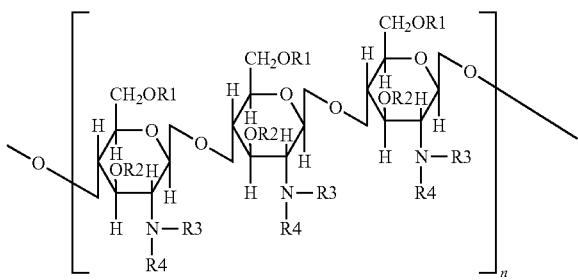

(I)

where R1 and R2 independently of one another represent H or $CH_2COOX$;
R3 and R4 independently of one another represent H, $CH_2COOX$, $CH_2CH_2Y$, $CH_2CH_2COOZ$, $COCH_3$, or $CH(CH_3)CH_2CH_2COOX$;
  where X represents a H, Na, Li or K,
  Y is selected from the following groups:

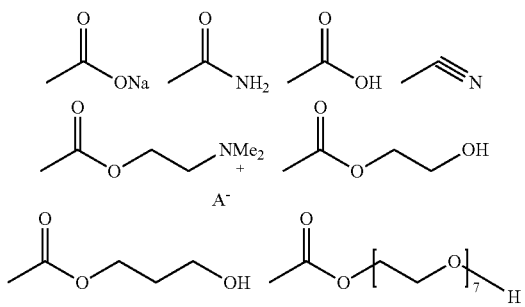

and Z is selected from H, $CH_2CH_3$, Na and K;
n represents a number between 35 and 6000; and with the proviso that at least one from among R1, R2, R3 and R4 represents a $CH_2COOX$ group.

Carboxymethylchitosan is the product of incorporating carboxymethyl groups in polymer chains of chitosan. These carboxymethyl groups can be incorporated at different anchoring points of said polymer chains of chitosan. In the context of the present application, a carboxymethylchitosan selected from the following is preferably used as a flocculating additive and setting accelerator:
  i) N,O-carboxymethylchitosan,
  ii) N-carboxymethylchitosan,
  iii) O-carboxymethylchitosan, and
  iv) N,N-carboxymethylchitosan The preferred embodiment of the invention contemplates the use of a N,O-carboxymethylchitosan, a polymer chain of chitosan [linear polysaccharide formed by randomly distributed chains of β-(1-4) D-glucosamine (deacetylated units) and N-acetyl-D-glucosamine (acetylated unit)] with carboxymethyl group substitutions on specific positions of the chain (N1, N2, O6).

Furthermore, the carboxymethylchitosan used in the context of the present invention must preferably have a degree of substitution with carboxymethyl groups and/or other groups comprised between 0.5 and 1.9. The degree of substitution (DSabs) determines the molar ratio of carboxymethyl groups with respect to monosaccharide units (Silva, D. A., et al., *Carbohydrate Polymers* 2004:58:163-171). It can be determined by means of potentiometric titration, for example (Abreu F R., and Campana-Filho S P. Polímeros: Ciencia y Tecnología 2005; 15(2):79-83).

More preferably the carboxymethylchitosan must have a degree of substitution between 0.7 and 1, even more preferably between 0.8 and 0.9. Therefore, as can be deduced, the use of carboxymethylchitosans with high degrees of substitution is preferred.

Another parameter defining the type of carboxymethylchitosan is the molecular weight thereof. In the context of the present invention, carboxymethylchitosan having a range of molecular weights comprised between 10 and 900 kDa can be used. A preferred embodiment of the invention contemplates the use of carboxymethylchitosan having molecular weight comprised between 10-100 kDa, more preferably between approximately 40-60 kDa. (The molecular weight of the carboxymethylchitosan can be determined, for example, according to the standard defined for chitosan, ASTM F2602-08e1 (*Standard Test Method for Determining the Molar Mass of Chitosan and Chitosan Salts by Size Exclusion Chromatography with Multi-angle Light Scattering Detection*)

As explained above, carboxymethylchitosan originates from the carboxymethylation of chitosan. The latter is in turn a product derived from the N-deacetylation of a natural biopolymer, chitin. The deacetylation process involves eliminating acetyl groups from the molecular chain of chitin, leaving a complete amino group (—$NH_2$) behind. The degree of deacetylation in a chitosan sample therefore refers to the free amino group content in the subunits of the polysaccharide and can be determined, for example, according to the method described by Hidalgo et al. (*Ars Pharm* 2008; 49 (3):245-257) or the ASTM F2260-03(2008) standard (*Standard Test Method for Determining Degree of Deacetylation in Chitosan Salts by Proton Nuclear Magnetic Resonance Spectroscopy*) among others.

In this sense, the carboxymethylchitosan can also be defined depending on the degree of deacetylation with respect to chitin from which it originates. In the context of the present invention, carboxymethylchitosans the degree of deacetylation of which with respect to chitin is comprised between 70 and 100% are used. The degree of deacetylation with respect to chitin must therefore be high, preferably around approximately 90%.

All types of carboxymethylchitosans described herein are commercially available or can be prepared, for example, according to the methods described in Kittur F. S. et al., Carbohydrate Polymers 2002; 49:185-193; and Mourya, V. K. and Inamdar N. N., Reactive & Functional Polymers 2008; 68:1013-1051.

A second object of the present invention is a composition comprising at least one carboxymethylchitosan and at least one binder for construction (hereinafter composition of the invention). In a particular embodiment, the binder is selected from the group consisting of a cement, a lime, a gypsum and/or mixtures thereof.

In another particular embodiment, the binder is a cement which, when suitably dosed and mixed with water and aggregates should produce a concrete or mortar preserving its workability long enough, reaching pre-established strength levels and having long-term volume stability. The cements to be used in the composition will preferably be types I to V Portland cements, for example, according to the European UNE EN 197-1:2000 standard, even though as recommended by the local conditions, natural cements or cements with special characteristics, for example, sulfate resistant cements, seawater resistant cements, low heat cements or white cements, may also be used.

In a particular embodiment of the invention, the cement which is used in the composition is of CEM II type, more preferably from the medium strength class, 32.5 N.

The compositions according to the invention comprise a carboxymethylchitosan with the general formula (I):

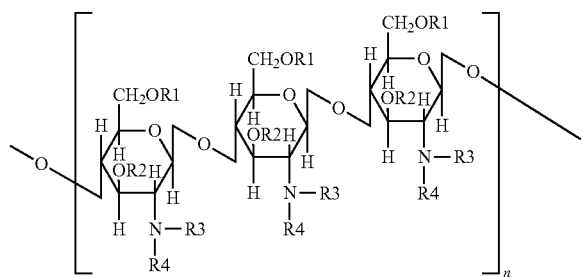

where R1 and R2 independently of one another represent H or CH₂COOX;
R3 and R4, independently of one another represent H, CH₂COOX, CH₂CH₂Y, (CH₂CH₂COOZ, COCH₃, or CH(CH₃)CH₂CH₂COOX;
where X represents a H, Na, Li or K,
Y is selected from the following groups:

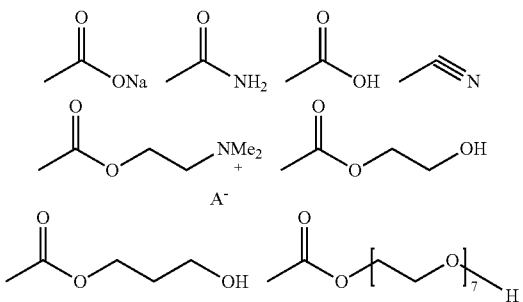

and Z is selected from H, CH₂CH₃, Na and K;
n represents a number between 35 and 6000; and with the proviso that at least one from among R1, R2, R3 and R4 represents a CH₂COOX group.

More specifically, the carboxymethylchitosan used in the composition of the invention is selected from:
i) N,O-carboxymethylchitosan,
(ii) N-carboxymethylchitosan,
iii) O-carboxymethylchitosan, and
iv) N,N-carboxymethylchitosan In a preferred embodiment, the carboxymethylchitosan used is a N,O-carboxymethylchitosan.

The degree of substitution of the carboxymethylchitosan of the composition of the present invention is comprised between 0.5 and 1.9, preferably between 0.7 and 1, more preferably between 0.8 and 0.9.

Likewise, the carboxymethylchitosan of the composition of the invention has a molecular weight comprised between 10 and 900 kDa, preferably between 10-100 kDa and more preferably between 40-60 kDa.

The degree of deacetylation of the carboxymethylchitosan of the composition with respect to chitin is comprised between 70 and 100%, preferably about approximately 90%.

Optionally, the composition of the invention can also comprise an aggregate. The aggregates will be formed by clean, hard, resistant particles with a uniform quality. The use of fine or coarse aggregates or a mixture of both will be made according to the thickness of the cementitious composition to be applied. The aggregates will be obtained by selecting and classifying natural materials or crushing materials, or by mixing both. According to this invention, the most commonly used particle size curves in mortar or concrete will be: 0-8, 0-12, and 0-15, included in the UNE 83607 standard.

The composition of the invention can also contain another type of additives and/or additions, such as for example, superplasticisers or water reducing agents, other rheology modifying agents, additional setting time modifiers, air-entraining agents, anti-foaming agents, water-repellent agents, etc.

The composition of the present invention acts as a binder and performs its function, being hardened when mixed with water. Therefore, a particular embodiment contemplates the composition of the invention which comprises a mixing fluid, preferably water. The kneading water must be clean and free of substances that may be detrimental to the composition (drinking water), and it will be constituted by the water directly added to the kneading, and by the water originating from the moisture of the aggregates themselves.

In a particular and preferred embodiment of the invention, the proportion by weight of the carboxymethylchitosan with respect to the binder in the composition is comprised between approximately 0.05 and 1%. A moderate thickening effect is achieved with proportions between 0.05 and 0.2%. Using proportions of between 0.2 and 1%, preferably between 0.3 and 0.5%, is preferred to obtain a stronger thickening effect.

When the composition of the invention is mixed with water, the water/binder ratio by weight must be comprised between 0.30 and 0.70, preferably between 0.45 and 0.55.

The composition according to the present invention is particularly useful in the preparation of mortar or concrete. The composition according to the present invention is also useful in the preparation of monolayer, rough-cast, grout, rendering, spray mortars or concretes, etc.

The composition of the present invention is prepared by mixing and kneading the elements thereof. The mixture can be prepared manually or preferably in a mixer, for example a concrete mixer. A cement mixer truck (concrete mixer truck) or a modular or multipurpose mixer plant could also be used. Kneading can be performed in a mechanical kneading machine or it can performed along with homogenizing in a cement mixer-kneading machine.

Therefore, another object of the present invention is a method for preparing the composition of the invention. The method comprises adding a carboxymethylchitosan to the binder. If the carboxymethylchitosan is added in the form of dry powder, the mixture must be homogenized and kneaded before being mixed with water for use. If the carboxymethylchitosan is added in the form of liquid solution, it may be incorporated to the kneading water. When the composition additionally comprises aggregates, they must be included in the dry mixture, which must also be homogenized and kneaded before being mixed with water for use.

In another embodiment of the invention, the method comprises the preparation of spread mortar or spread concrete. Said method can be performed by three different processes namely: dry mixing, wet mixing and semi-wet mixing:

Dry mixing is a method whereby all the components of the composition are previously mixed, except for water which is added in the nozzle before spreading the mixture, the dry mixture being transported through pneumatic hoses to the nozzle. The process is schematically summarized in the following manner: The binder and the aggregates are mixed to achieve perfect homogeneity;

the mixture is introduced into a feeder, entering the hose by means of a distributor; the mixture is transported by means of pressurized air to a special nozzle or gun equipped with a perforated multiple distributor through which pressurized water which is mixed with the binder/aggregates mixture is sprayed. Finally, the already wet mixture is spread on the support to be sprayed. The binder is preferably a cement.

The first phases of the semi-wet mixing system are identical to that of dry mixing. It only differs in that it allows aggregate moisture of up to 10% and in that water is added at a distance of approximately 5 m from the nozzle, so the properties of the mixture improve upon reaching the nozzle from which the spread mortar or concrete will be released.

The wetting system requires incorporating the carboxymethylchitosan and optionally other additives together with water in a nozzle and can be divided into 2 different processes: diluted flow (rotor) and dense flow (pump), the mixture transporting system being different, i.e., by means of compressed air in the case of diluted flow and by means of pumping in the case of dense flow.

The following examples serve to illustrate the invention but are not intended to limit same.

EXAMPLES

Example 1

Preparation of Cement Mortars

Mortars were prepared with ordinary CEM II 32.5 N type Portland cement and standardized siliceous aggregate from the Science Institute of Construction Eduardo Torroja (Spain).

Kneadings were performed in a cement:aggregate ratio of 1:3, a mixture commonly used in construction. To prevent measurement errors, work was done with ratio by weight, 450 g of cement and 1350 g of aggregate being incorporated. The water/cement ratio was studied for three different amounts, 0.45, 0.50 and 0.55, in order to confirm that the effect of polymer addition was maintained for different ratios of water. The additive was added in the form of powder and in different amounts (0%—control group—0.05, 0.10, 0.20, 0.30, 0.40 and 0.50% weight/weight with respect to the cement), for the purpose of studying the dosage effect.

The additives tested were the following:

Additive 1, carboxymethylchitosan (CMC) from Heppe Medical Chitosan (GMBH, (reference: 40002; batch: 302-190809-01). It is a N,O-carboxymethylchitosan with an approximate molecular weight of 51 kDa and of formula II:

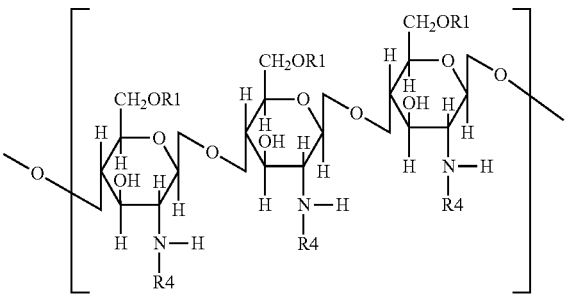

where R1 and R4 independently of one another represent H or $CH_2COOH$; and where 90% of the monomers have at least one H atom substituted with $CH_2COOH$.

Additive 2, non-modified, high molecular weight chitosan (HMWC) (Sigma Aldrich, 419419-50G; molecular weight 310-375 kDa and 76% degree of deacetylation).

Additive 3, hydroxypropylchitosan (HPC) (synthesized according to the method listed in Mourya and Inamdar, *Reactive & Functional Polymers* 2008; 68:1013-1051, where 7.5 g of non-modified chitosan are treated with 75 mL of ~50% weight/weight—NaOH solution, stirring at room temperature for 2 hours. It is introduced into a freezer at −18° C. for 48 hours. It is thawed and added to 100 mL of 2-propanol, stirring for 1 hour at 40° C. 75 mL of propylene epoxide are added and it is put under reflux for 2 hours at 60° C. with continuous stirring. The pH is adjusted to 7 with HCl 1:1 volume:volume, filtering and washing the product with acetone and alcohol, finally lyophilizing).

Additive 4, hydroxypropylmethylcellulose (HPMC) (Combicell HK 15M, from Hercules Ashland Aqualon).

All the components in dry state (cement, aggregate and additive) were mixed and homogenized in a V-shaped additive mixer (Lleal) for 10 minutes. That mixture was then brought to a Proeti ETI 26.0072 kneading machine. The dry mixture was subjected to stirring for 90 seconds. The pre-established amount of water was added and mixed for another 90 seconds at low speed according to the regulation for mortar preparation (European EN 1015-2 standard, section 6.2.2, *Methods of test for mortar for masonry. Part II: bulk sampling of mortars and preparation of test mortar*). The mixture was left to settle for 10 minutes before performing the corresponding test to allow the additive to perform its action.

Example 2

Flocculating Effect which the Incorporation of Carboxymethylchitosan has on Cement Mortars in Fresh State 1. Flow Table Test Once the corresponding cement mortars are prepared as described in Example 1, the flow table test was performed in duplicate according to UNE-EN 1015-3: 2000 standard. This standardized test provides a slump flow value for the mixture of mortar in fresh state which serves for evaluating mass consistency and its workability, providing idea on the plasticising or flocculating effect of possible added additives. The results of slump cone value measured in mm in the flow table for mortars in fresh state are listed in Table 1.

TABLE 1

Slump cone values (mm) in the flow table for mortars in fresh state prepared with a water/cement ratio of 0.5.

| | % additive/cement | | | | | | |
|---|---|---|---|---|---|---|---|
| | 0% | 0.05% | 0.10% | 0.20% | 0.30% | 0.40% | 0.50% |
| Additive 1: CMC | 199.5 | 165.1 | 147.4 | 117.8 | 100.5 | 98.9 | 100 |
| Additive 2: HMWC | 199.5 | 208.3 | 196.8 | 197.6 | 181.6 | 182.6 | 165.1 |
| Additive 3: HPC | 199.5 | 207.1 | 207.4 | 205.3 | 192.3 | 182 | 201.2 |
| Additive 4: HPMC | 199.5 | 193.6 | 189.3 | 168.3 | 157.2 | 155.5 | 148.3 |

The values obtained for the carboxymethylchitosan derivative, additive 1 (CMC), object of the present invention were compared with those obtained for a non-modified, high molecular weight chitosan, additive 2 (HMWC), for a chitosan modified by etherification and introduction of hydroxypropyl groups, additive 3 (HPC), and for a commercial cellulose ether, an additive commonly used in cements as rheology modifier, a hydroxypropylmethylcellulose, additive 4 (HPMC). With respect to this commercial thickening agent, mortar rheology modifier, the additive CMC, object of this invention, shows a much higher flocculating capacity with the slump flow reduced to half starting from doses as low as 0.3% (practically 50% slump flow reduction with CMC with respect to 21.2% with additive 4). The other additives (non-modified chitosan and hydroxypropylchitosan) show a much lesser effect as thickening agents than those mentioned above. It must be highlighted that a 26% slump flow reduction is achieved with CMC at doses as low as 0.10%.

2. Particle Size Determination

This strong flocculating effect of the CMC derivative has also been seen in the measurements of particle size distribution performed on cement suspensions with water and additive incorporated in increasing doses by means of a Malvern Mastersizer laser diffraction equipment. The suspensions were prepared with 20 g of the cement used and 100 g of aqueous solution with increasing amounts of additive (from 0% control group, 0.1; 0.2; 0.3; 0.4; 0.5; 0.6; 0.7; 0.8; 0.9 and 1% with respect to the cement weight). The results are listed in FIGS. 1 to 4.

Figure 2:
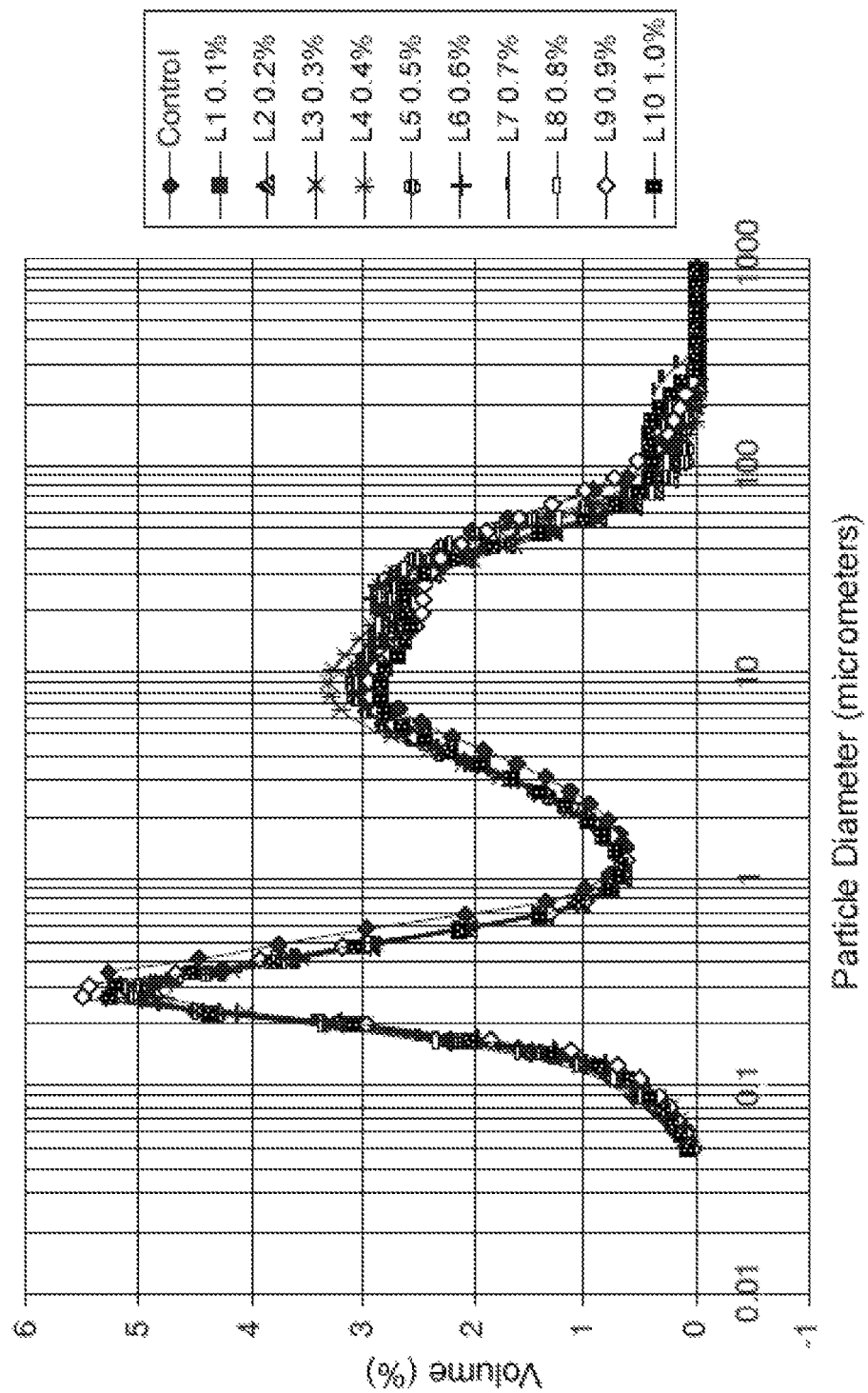
FIG. 2 shows the results of particle size distribution in cement suspensions for additive 2, non-modified, high molecular weight chitosan. Control: 0% additive. H1 to H10 (0.1% to 1% additive, weight/weight of additive/cement). Particle diameter vs % volume.
Figure 3:
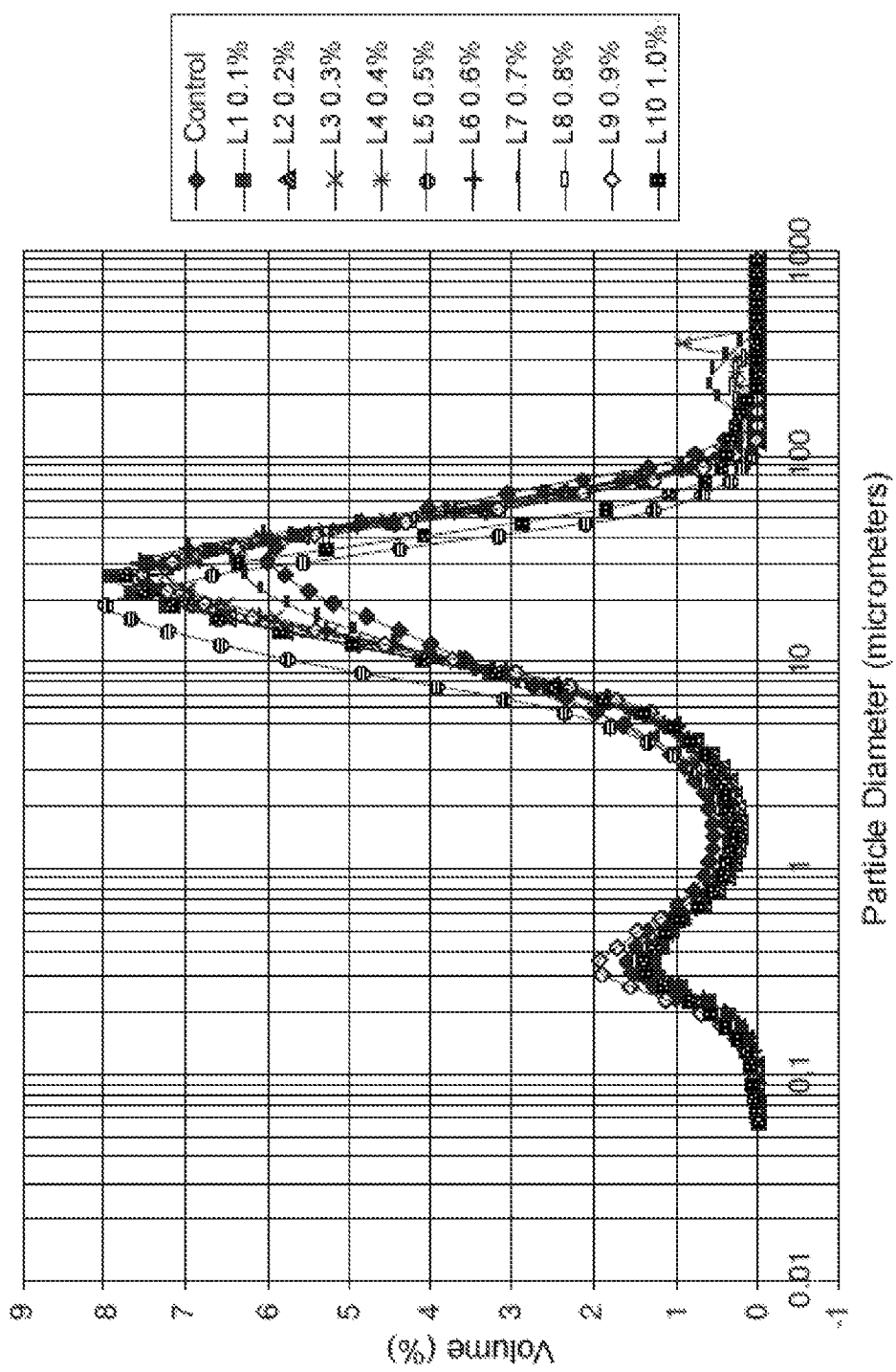
FIG. 3 shows the results of particle size distribution in cement suspensions for additive 3, hydroxypropylchitosan. Control: 0% additive. L1 to L10 (0.1% to 1% additive, weight/weight of additive/cement). Particle diameter vs % volume.
Figure 4:
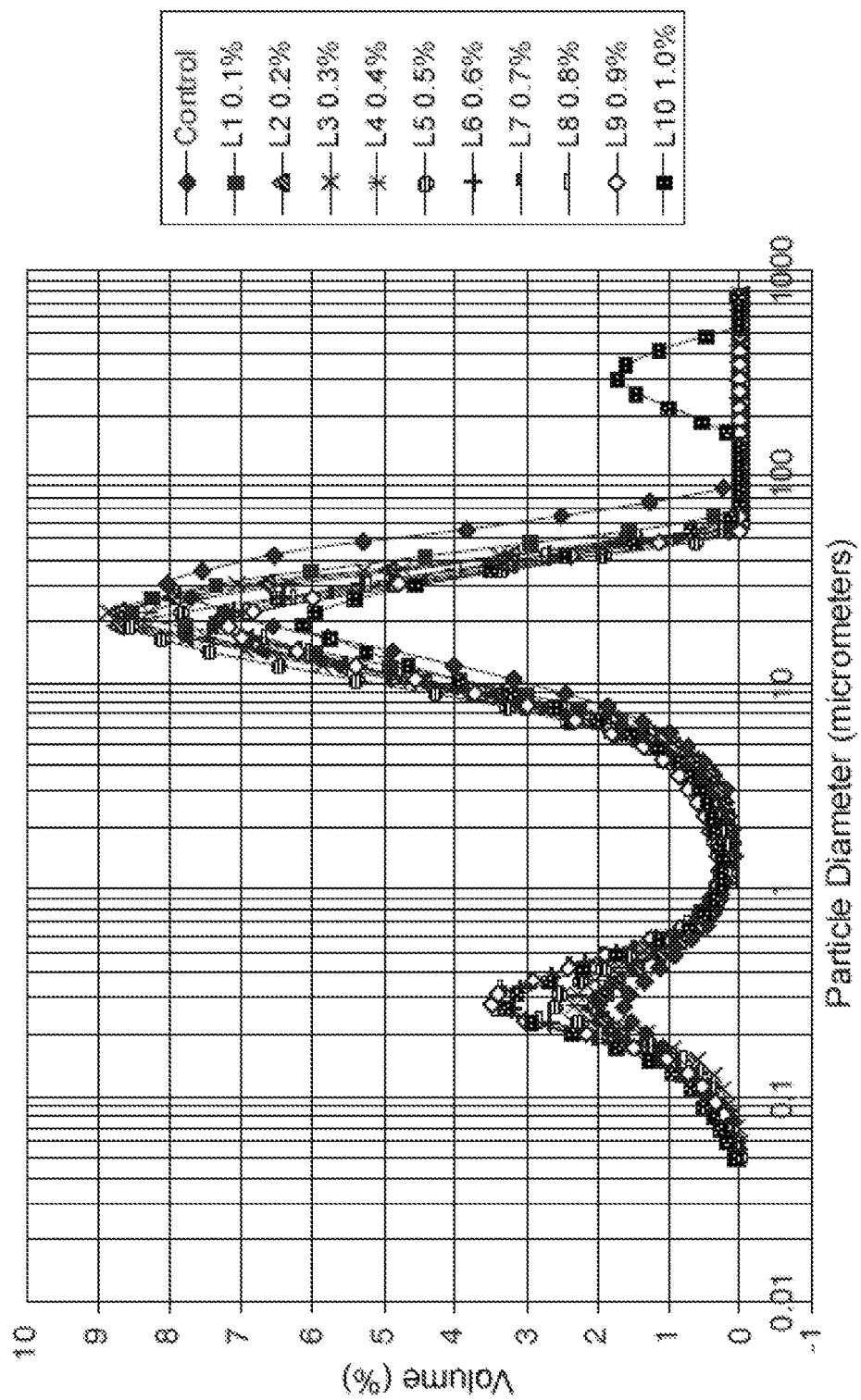
FIG. 4 shows the results of particle size distribution in cement suspensions for additive 4, hydroxypropylmethylcellulose. Control: 0% additive. Suspensions 1 to 10 (0.1% to 1% additive, weight/weight of additive/cement). Particle diameter vs % volume.
Figure 5:
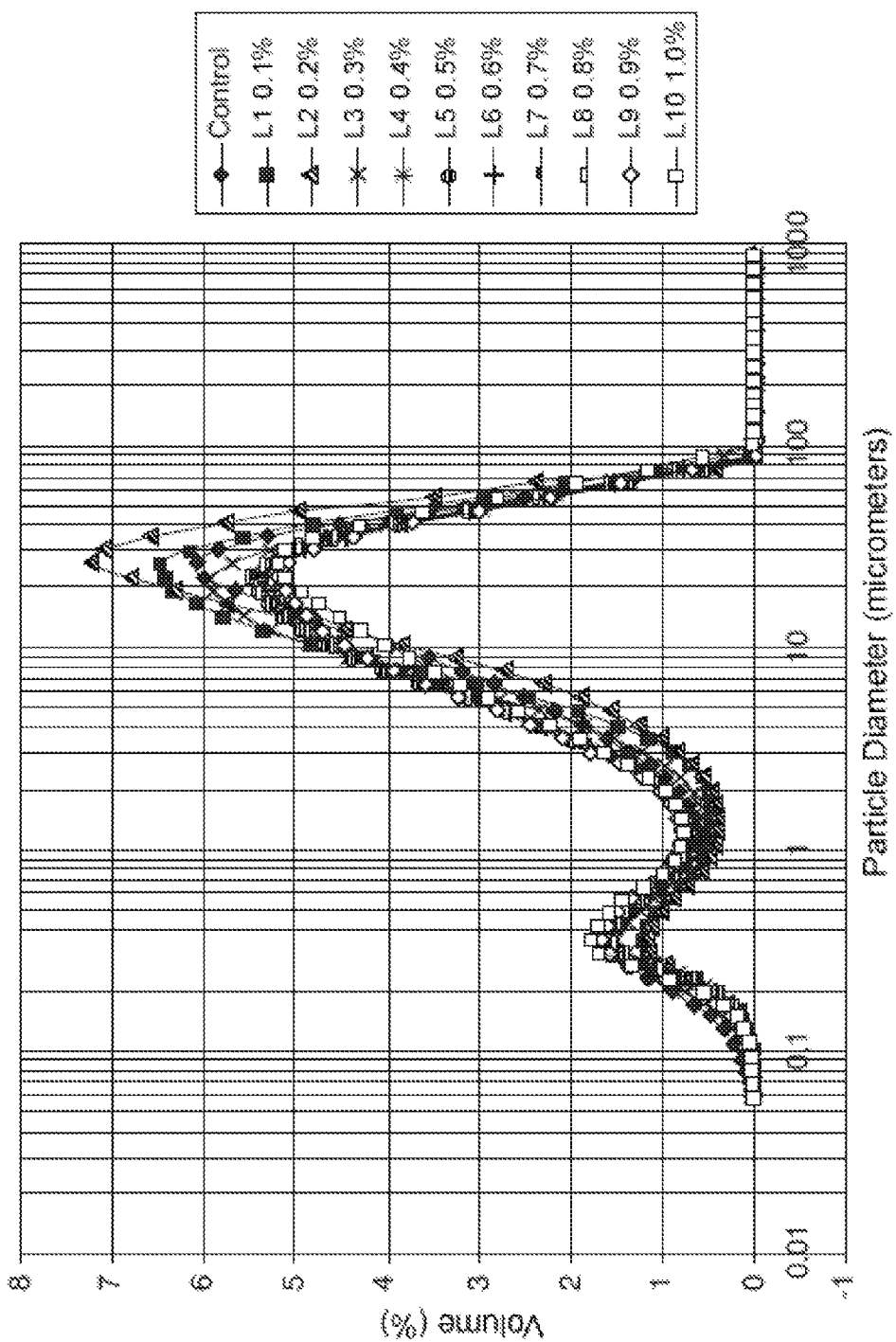
FIG. 5 shows the results of particle size distribution in cement suspensions for a superplasticising additive, MELFLUX 2651 F (copolymer of methylpolyethylene glycol-methacrylate and methacrylic acid and sodium salts). Control: 0% additive. L1 to L10 (0.1% to 1% additive, weight/weight of additive/cement). Particle diameter vs % volume.

It can be observed that the incorporation of CMC, with increasing-dose effect, generates agglomerates having greater particle size, with diameters of 300 to 450 micron (FIG. 1), resulting in the flocculating effect described above in the flow table measurements. However, additives 2, 3 and 4 do not generate that effect (FIGS. 2, 3 and 4). By comparison, a similar graph obtained for a commercial superplasticiser (MELFLUX 2651 F, from BASF Construction Polymers), copolymer of methylpolyethylene glycol-methacrylate and methacrylic acid and sodium salts, used in cements (FIG. 5), is provided. The effect opposite to that of CMC can be observed: complete absence of large particle agglomerates and dose-dependent increase of particles around 0.3-0.4 micron and reduction of particle volume between 20 and 30 micron.

Both the results of the flow table test and the results of particle size distribution confirm the extremely strong flocculating power that the addition of CMC has over the cement mixtures, which power is much greater than that of other rheology modifying additives. Without wishing to be restricted by this theory, the inventors understand that the introduction of many carboxymethyl groups, ionizable at the strongly alkaline pH of the cement systems, generates many carboxylate groups which can function as anchoring groups for anchoring on cement particles, binding them to one another, giving rise to a crosslinking structure, with particle agglomerates of large diameters, proving the flocculating action of this additive.

Groups with a fewer number of ionizable or non-soluble substituents (additives 2, 3 and 4) are not capable of achieving this effect. The degree of substitution of the derivative CMC is also important: the tested derivative with a degree of 0.9 provides a significant number of binding groups for binding and holding the cement particles, whereas the bibliography highlights fewer substitutions in carboxylate groups for polycarboxylate ether-based plasticisers [Plank and Hirsch, *Cement and Concrete Research* 2007; 37:537-542; Zingg et. al. *Journal of Colloid and Interface Science* 2008; 323:301-312; Plank and Sachsenhauser *Cement and Concrete Research* 2009; 39:1-5]. Unlike carboxymethylchitosan, the behavior of the commercial additive 4, hydroxypropylmethylcellulose, which is also used as a rheology modifying agent (VEA, viscosity-enhancing admixture) that is only capable of generating agglomerates of large diameter at the highest dose, as shown in FIG. 4, and in a relatively low percentage, is especially significant.

3. Surface Zeta Potential Determination

The measurements of surface zeta potential of the cement particles in aqueous solution with the presence of the polymer in increasing doses (from 0% control group, 0.1; 0.2; 0.3; 0.4; 0.5; 0.6; 0.7; 0.8; 0.9 and 1% with respect to the cement weight) confirm the interaction with the cement particles. Table 2 shows the data for the increasing doses of additive, more negative zeta potential values being observed (as a result of the particle adsorption of the CMC, which is now a negatively charged polyelectrolyte, on the cement particles). This adsorption mechanism has been described for superplasticisers (the experimental data of which are also shown), generating more negative values, as a result of the fewer substitution with ionizable groups (the superplasticiser used is a PCE derivative, polycarboxylate ether, which, as has been indicated in various bibliographic references, have lower charge density originating from carboxylate groups). The higher number of CMC functional groups (and, therefore, its greater charge density) and the absence of hydrophobic side chains justify the more negative zeta potential values and can explain the greater degree of interaction thereof with cement particles.

TABLE 2

Surface potential values of cement particles in solutions of 0% polymer (control) and increasing amounts of 1 to 10 for additive 1, CMC, and a commercial superplasticiser (polycarboxylate ether).

|  | CONTROL: 0% polymer | 1 | 2 | 3 | 4 | 5 | 6 | 7 | 8 | 9 | 10 |
|---|---|---|---|---|---|---|---|---|---|---|---|
| Additive 1: CMC | 0.07 | −17.7 | −15.98 | −21.905 | −16.97 | −19.90 | −28.89 | −32.005 | −35.435 | −34.535 | −36.43 |
| Super-plasticiser | 0.07 | −8.35 | −6.99 | −9.45 | −6.49 | −7.45 | −11.45 | −12.50 | −13.72 | −12.77 | −13.22 |

Example 3

Setting Accelerating Effect which the Addition of CMC has on Cement Mixtures

1. Workability Time Determination

Cement mortars were prepared as described in Example 1 and the workability time, which is a setting-related parameter that can be determined in mortars in fresh state was determined. Said workability time was determined according to EN 1015-9 regulation—*Methods of test for mortar for masonry*—Part 9: *Determination of workable life and correction time of fresh mortar*. The values provide figures in minutes relating to time period starting from which the rigidity of the mass is such that rectifying the mass is impossible. The setting thereof is considered to have ended. Table 3 provides the experimentally obtained data.

TABLE 3

Values in minutes of the workability time for different mortars prepared with a water/cement ratio of 0.5.

| | % additive/cement | | | | | | |
|---|---|---|---|---|---|---|---|
| | 0% | 0.05% | 0.10% | 0.20% | 0.30% | 0.40% | 0.50% |
| Additive 1: CMC | 322 | 307 | 247 | 112 | 37 | 22 | 7 |
| Additive 2: HMWC | 322 | 340 | 362 | 314 | 362 | 326 | 324 |
| Additive 3: HPC | 322 | 322 | 292 | 277 | 277 | 277 | 262 |
| Additive 4: HPMC | 322 | 495 | 379 | 426 | 518 | 465 | 483 |

The considerable reduction in workability time which is achieved with the incorporation of carboxymethylchitosan (additive 1) to the mortar can be observed, with a reduction of 98% in workability time when incorporating 0.50% additive to the mass with respect to the additive-free control group. By comparing the effect of this carboxymethylchitosan with that of another derivative such as hydroxypropylchitosan (additive 3), the difference is substantial, since even though the latter also accelerates setting, it performs same to a much lesser extent.

Compared the other two additives (2 and 4), the non-modified chitosan (additive 2), due to its slight solubility, very poorly modifies the setting time. HPMC (additive 4) acts in accordance with what has been documented, and it is a setting retarding agent (increases workability time).

This effect of carboxymethylchitosan, a workability time reducing agent, can be linked to the flocculating or thickening action discussed in the preceding example, increasing the rigidity of the mixture in short periods of time (where the workability of the mixture in fresh state is precisely measured).

The invention claimed is:

1. A method for preparing mortar or concrete comprising adding a carboxymethylchitosan as a flocculating additive and a setting accelerator to a construction useable binder composition wherein the carboxymethylchitosan has the general formula (I):

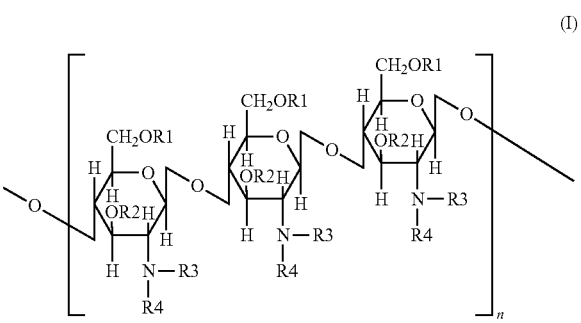

where:
R1 and R2 independently of one another represent H or $CH_2COOX$;
R3 and R4 independently of one another represent H, $CH_2COOX$, $CH_2CH_2Y$, $CH_2CH_2COOZ$, $COCH_3$, or $CH(CH_3)CH_2CH_2COOX$;
X represents a H, Na, Li or K,
Y is selected from one of the following groups:

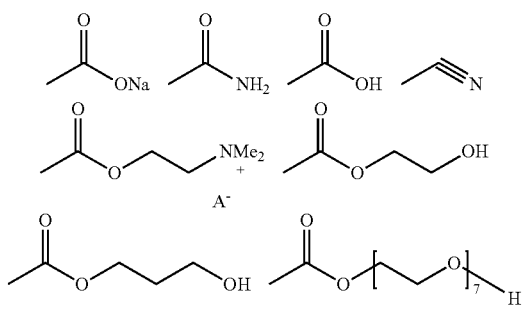

Z is selected from H, $CH_2CH_3$, Na and K;
n represents a number between 35 and 6000; and
at least one from among R1, R2, R3 and R4 is a $CH_2COOX$ group.

2. The method according to claim 1, wherein the carboxymethylchitosan is selected from:

i) N,O-carboxymethylchitosan,
ii) N-carboxymethylchitosan,
iii) O-carboxymethylchitosan, and
iv) N,N-carboxymethylchitosan.

3. The method according to claim 2, wherein the carboxymethylchitosan has a degree of substitution with carboxymethyl groups and other groups of between 0.5 and 1.9.

4. The method according to claim 3, wherein the carboxymethylchitosan has a molecular weight between 10 and 900 kpa.

5. The method according to claim 4, wherein the degree of deacetylation of carboxymethylchitosan with respect to chitin is between 70 and 100%.

6. A composition comprising
  at least one carboxymethylchitosan and at least one construction useable binder,
  wherein the at least one carboxymethylchitosan has the general formula (I):

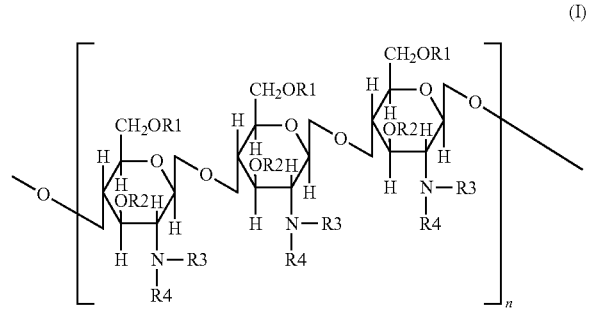

where R1 and R2 independently of one another represent H or $CH_2COOX$;
R3 and R4 independently of one another represent H, $CH_2COOX$, $CH_2CH_2Y$, $CH_2CH_2COOZ$, $COCH_3$, or $CH(CH_3)CH_2CH_2COOX$;
where X represents a H, Na, Li or K,
Y is selected from the following groups:

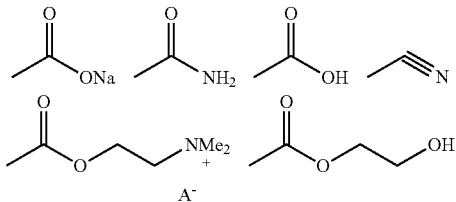

and Z is selected from H, $CH_2CH_3$, Na and K;
n represents a number between 35 and 6000; and
wherein at least one of R1, R2, R3 and R4 represents a $CH_2COOX$ group and wherein the proportion by weight of the at least one carboxymethylchitosan with respect to the at least one binder is between 0.05 and 1%.

7. The composition according to claim 6, where the at least one binder is selected from the group consisting of a cement, a lime, a gypsum and mixtures thereof.

8. The composition according to claim 7, where the at least one binder is a cement.

9. The composition according to claim 6, wherein the at least one carboxymethylchitosan is selected from:
  i) N,O-carboxymethylchitosan,
  ii) N-carboxymethylchitosan,
  iii) O-carboxymethylchitosan, and
  iv) N,N-carboxymethylchitosan.

10. The composition according to claim 6, wherein the at least one carboxymethylchitosan has a degree of substitution comprised between 0.5 and 1.9.

11. The composition according to claim 6, wherein the at least one carboxymethylchitosan has a molecular weight comprised between 10 and 900 kpa.

12. The composition according to claim 6, wherein the degree of deacetylation of the at least one carboxymethylchitosan with respect to chitin is comprised between 70 and 100%.

13. The composition according to claim 6 further comprising one of: (i) water, and (ii) water and an aggregate.

14. The composition according to claim 6 further comprising one or more additives, said one or more additives selected from superplasticisers, water reducing agents, rheology modifying agents, additional setting time modifiers, air-entraining agents, anti-foaming agents and water-repellent agents.

15. The composition according to claim 13, wherein the water/binder ratio by weight is comprised between 0.30 and 0.70.

16. A method for preparing a composition according to claim 6 comprising adding the at least one carboxymethylchitosan to the at least one binder.

* * * * *